United States Patent [15] 3,643,859

Kreisel, Jr. [45] Feb. 22, 1972

[54] SHOPPER CALCULATOR AND COMPARISON DEVICE

[72] Inventor: George R. Kreisel, Jr., 4719 Parkman Ct., Annandale, Va. 22003

[22] Filed: Aug. 11, 1970

[21] Appl. No.: 62,801

[52] U.S. Cl. ........ 235/88
[51] Int. Cl. ........ G06c 3/00
[58] Field of Search ........ 235/84, 88, 78, 85 R

[56] References Cited

UNITED STATES PATENTS

| | | | |
|---|---|---|---|
| 1,506,112 | 8/1924 | Cutshaw | 235/84 |
| 3,358,920 | 12/1967 | Ringley | 235/88 |
| 2,595,299 | 5/1952 | Russell | 235/84 |
| 2,871,582 | 2/1959 | Frank | 235/84 X |
| 3,275,235 | 9/1966 | Balch | 235/84 |
| 3,397,838 | 8/1968 | Ostrander et al. | 235/70 |
| 3,551,647 | 12/1970 | Luster | 235/88 |

OTHER PUBLICATIONS

Products: What' s Newest...Supermarket Slide Rule, Newsweek, July 31, 1961, p. 63.

*Primary Examiner*—Richard B. Wilkinson
*Assistant Examiner*—Stanley A. Wal
*Attorney*—Jones and Lockwood

[57] ABSTRACT

This disclosure relates to a calculator and comparison device for use by shoppers in determining the most economical brand or package of a variety of brands or sizes of the same product. The device has a center disc which has a series of logarithmic scales which are marked-off in indicia of dollars and cents values, and an outer disc which is carried on the center disc which has a logarithmic scale measured in standard weight measure units. The outer disc is smaller in diameter than the center disc thus permitting the scales on the center and outer discs to be read simultaneously. The center disc and the outer disc are rotatable with respect to each other about their center axis. A transparent member is rotatably secured on the outer disc and is associated with the center and outer discs. The transparent member has a scale marked-off in indicia of units, cans, boxes, etc. The scale on the transparent member may be superimposed over the scales on the center and outer discs, thereby permitting the three scales to be read and used simultaneously. Some means to reduce friction is provided between the center and outer discs so that the outer disc and transparent member can be rotated together about the center axis of the disc without moving the center disc.

28 Claims, 6 Drawing Figures

INVENTOR
GEORGE R. KREISEL, JR.
BY Jones and Lockwood
ATTORNEYS

INVENTOR
GEORGE R. KREISEL, JR.
BY Jones and Lockwood
ATTORNEYS

INVENTOR
GEORGE R. KREISEL, JR.
BY Jones and Lockwood
ATTORNEYS

INVENTOR
GEORGE R. KREISEL, JR.
BY Jones and Lockwood
ATTORNEYS

SHOPPER CALCULATOR AND COMPARISON DEVICE

BACKGROUND OF THE INVENTION

This invention relates to a calculating device and more particularly to a comparison device which can be used by the shopper to compare the unit price of a variety of brands which are presented for sale in a store.

Presently, the merchandising practices used in many stores and especially in the food markets make it very difficult for the shoppers to compare prices between the two brands to determine the most economical brand to buy. These merchandising practices include different size packages, for example, 15- and 25-ounce packages of cereal are sold at 48 cents and 72 cents, respectively. The problem presented to the shopper is to determine which particular package of the many varying sizes of products, for example, the single size, the family size or the large economy size he should buy. This determination requires mental calculation or a comparison device for mathematical analysis.

Furthermore, since many stores sell a plurality of cans, boxes or the like for a particular price, for example, three for a dollar, two for 79 cents, etc., this adds a second calculation for the shopper to again determine which of the products or brands is the most economical to buy.

There have been some devices devised which permit one to determine the price per ounce of different products, and some stores have aided the consumer by providing the price per ounce on the shelves so that no comparison is needed. However, most stores do not practice this consumer aid, and the calculating devices which give the price per ounce do not permit the consumer to determine the most economical product where there is a plurality of units, cans, boxes, etc., which are on sale at a specified price.

From the foregoing, it can be seen that there exists a need for a calculator and comparison device which will not only provide the price per ounce but will also provide the most economical buy from a group of products which are sold as a plurality of units for a certain price.

SUMMARY OF THE INVENTION

It is, therefore, an object of this invention to provide a calculating device to eliminate lengthy and complex calculations for the consumer when comparing the prices of a variety of competitive consumer goods or the prices of different-sized containers of the same product.

Another object of this invention is to provide a calculating and comparison device which has three separate scales for comparing the prices of various items and the prices of a plurality of units of such items sold at a specific price.

Another object of this invention is to provide a calculating and comparison device which has various movable parts which are made of an inexpensive material so that they may be economically made.

Another object of this invention is to provide a calculator and comparison device having a center disc and outer disc which have peripheral scales which can be used and read simultaneously and a transparent member having a scale which is associated with the center and outer discs and which permits its scales to be superimposed over the scales of the center and outer discs so that the scales on the three members may be used and read simultaneously.

Another object of this invention is to provide means to reduce the friction between the center disc and outer disc so that the outer disc and transparent member can be rotated together easily without the center disc being moved.

These and other objects are accomplished by the present invention through the use of a calculator and comparison device including a large center disc having scales marked off around the peripheral edge of opposite sides of the center disc, the scales being in four logarithmic series with indicia corresponding to dollars and cents values. Two outer discs are carried on opposite sides of the center disc and have a plurality of scales around their peripheral edge, one of the outer discs being marked off in dry weight measure while the other disc is marked off in liquid measure. The outer discs are rotatable with respect to the center disc about the center axis of the disc. A pair of transparent members having a scale with the indicia indicating unit measure, for example, one, two, three, four, five or six packages or items, are carried on and positioned adjacent to each of the outer discs, respectively. The transparent members are also rotatable about the center axis of the disc, and the transparent members extend approximately to the edge of the center disc. The scale on the transparent member is therefore, superimposed over the scales on the center and outer discs so that the three scales can be used and read simultaneously. A spacer is provided in a center opening in the center disc and the outside discs are clamped by a fastener to the spacer so that the outer discs will rotate with respect to the center disc more easily.

BRIEF DESCRIPTION OF THE DRAWINGS

The foregoing and additional objects, features and advantages of the invention will be apparent to those skilled in the art from the following detailed description of a preferred embodiment taken with the accompanying drawings, in which.

DESCRIPTION OF A PREFERRED EMBODIMENT

Figure 1:
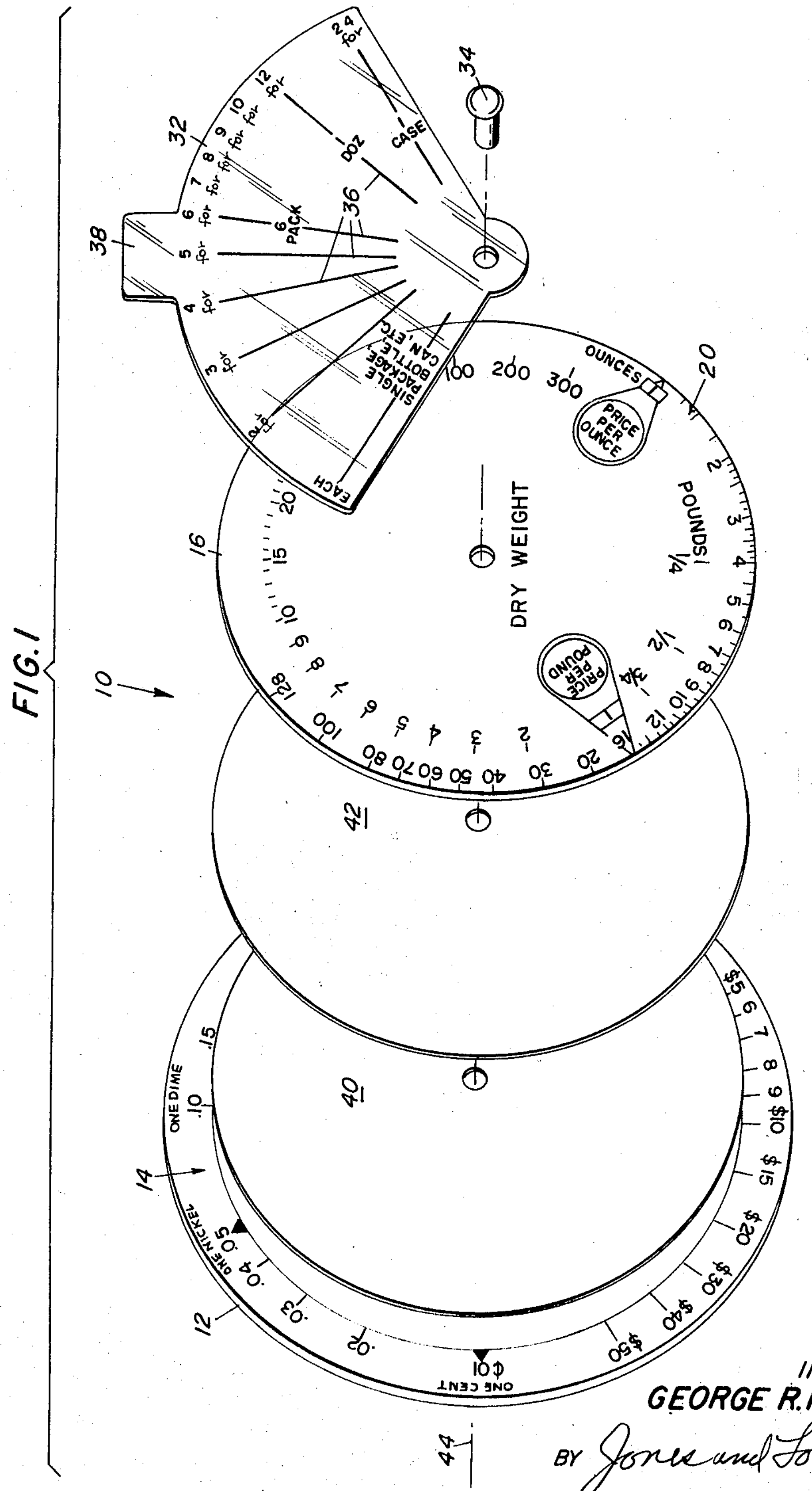
FIG. 1 is a perspective exploded view of a first embodiment of a calculator and comparison device according to the present invention.
Figure 2:
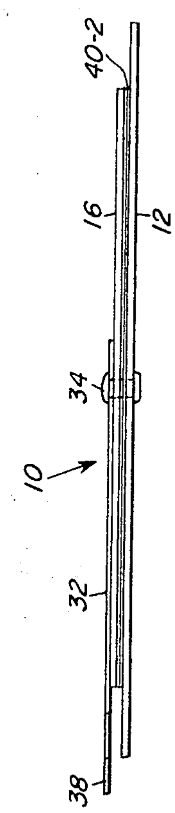
FIG 2 is a side view of the device shown in FIG. 1.

Referring more particularly to the drawings, in FIGS. 1 and 2, the numeral 10 generally indicates a calculator and comparison device having a center disc 12 which has a scale 14 around its peripheral edge. The scale 14 is a logarithmic series and is marked off in indicia of dollars and cents values having four subscales A, B, C and D (see FIG. 3), ranging from 1 cent to 10 cents, 10 cents to 1 dollar, 1 dollar to 10 dollars, and 10 dollars to 50 dollars, respectively. The center disc 12 can be made of any suitable material such as plastic, paper, and the like. In this particular embodiment, the disc is made of a heavy paper or cardboard.

An outer disc 16 which is smaller in diameter than center disc 12 is secured to the center disc 12 on the same side of the disc that the monitary scale 14 is located so that the edge of outer disc 16 is contiguous to the monitary scale 14 on the center disc 12. The markings on monitary scale 14 on the center disc 12 are arranged in such a way that the numerals are located outwardly from the hash marks which extend inwardly toward the edge of the outer disc 16, as can be seen at 18 in FIG. 3. In this embodiment, the outer disc 16 has a dry weight measure scale 20 around its peripheral edge. The dry weight scale 20 normally has two separate subscales 22 and 24 (see FIG. 3). Subscale 22 is a logarithmic scale, and the scale is marked off in indicia indicating ounces ranging from 1 to 128. The numeral indicia on subscale 22 are inwardly from the hash marks so that the hash marks of the subscale may be aligned with the hash marks of the monitary scale 14. Subscale 24 is also a dry weight scale and is marked off in indicia indicating pounds ranging from ¼ to 300. The indicia on subscale 24 are arranged to correspond with the appropriate ounce indicia on subscale 22. For example, one-quarter of a pound on subscale 24 is aligned with the 4-ounce mark on subscale 22, and the 1-pound mark on subscale 24 is aligned with the 16-ounce mark on subscale 22. A secondary subscale 26 (see FIG. 3) is provided between the 1-pound and the 4-pound hash mark on subscale 24. This secondary subscale 26 is marked off in ounces, for example, 16 ounces which is the equivalent of 1 pound is marked off between 1 pound and 2-pound hash marks on the subscale 24. To increase the usability of the calculating device, the 1-ounce and 1-pound hash marks on subscales 22 and 24, respectively, are indicated by enlarged arrows 28 and 30, respectively. When the calculating device is being used, the arrows are very helpful because the shopper can quickly determine a price per ounce or price per pound.

Figure 3:
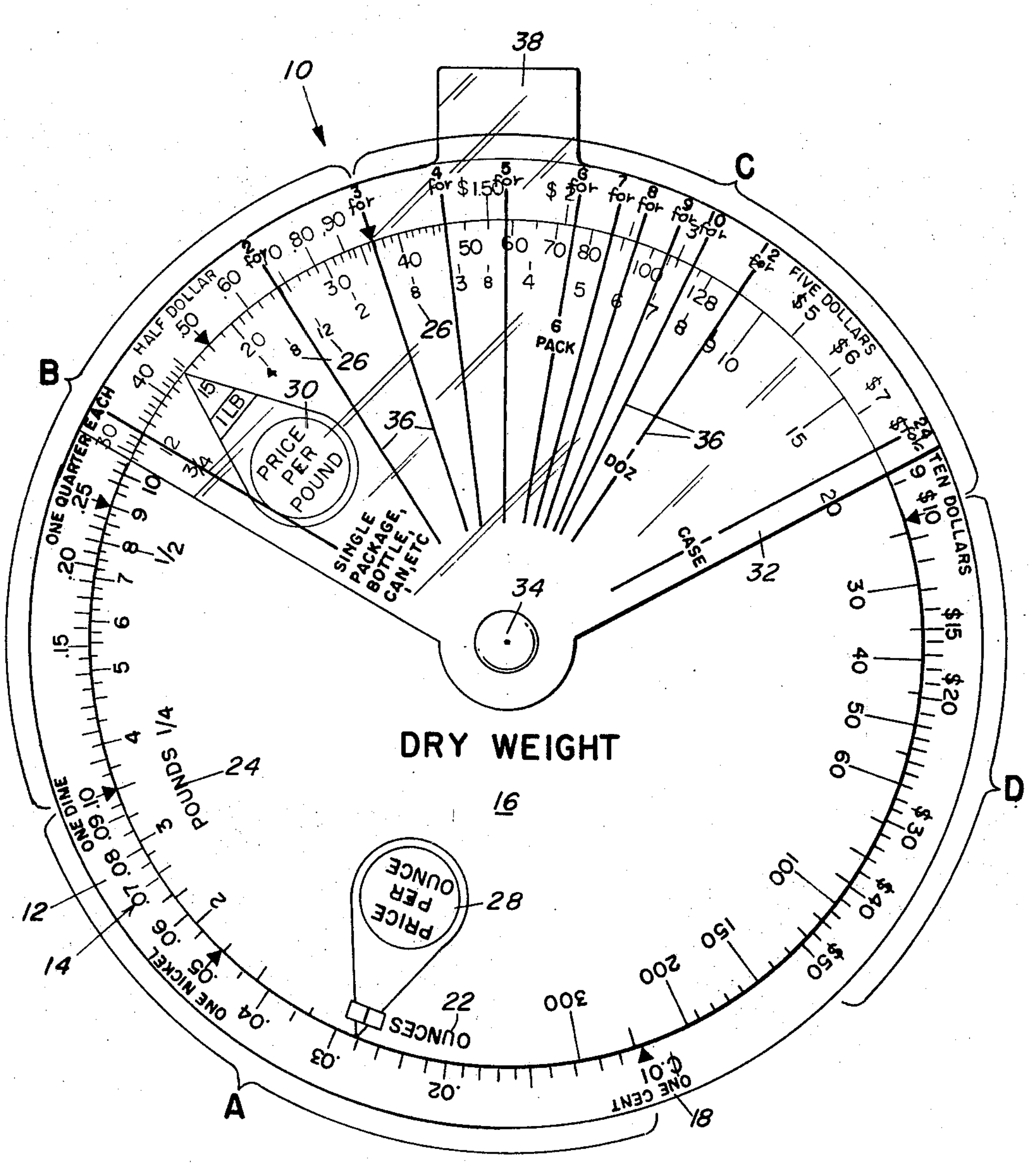
FIG. 3 is a plan view of a calculator and comparison device according to the present invention showing the scales for use in dry weight measure calculations.

An arc-shaped transparent member 32, which can be made of any suitable material, is secured to the center disc 14 and outer disc 16 by a suitable fastener 34. The fastener 34 extends through the center of the disc and permits the separate elements—the center disc 12, outer disc 16 and transparent member 32—to be rotated with respect to each other. In this particular embodiment, the arc-shaped transparent member has a radius approximately the same diameter as the center disc 12, and the transparent member 32 has a unit scale 36 of the logarithmic type ranging from 1 to 24 units. The unit scale 36 is provided with indicia indicating a single can, package, or the like, a six-pack, a dozen, or case, and these indicia correspond to the appropriate hash mark on the transparent member. As can be seen in FIG. 3, the scale 36 on the transparent member 32 overlays the monitary scale 14 and the dry weight scales 22 or 24 on the center disc 12 and the outer disc 16, respectively, thereby permitting the monitary, dry weight, and unit scales to be used and read simultaneously. The unit scale 36 has a logarithmic series from 1 to 10 and a partial logarithmic series from 10 to 24 as seen in FIG. 3. All the scales used on the calculator and comparison device should be graduated in the same logarithmic relationship.

A tab 38 is provided on the transparent member 32 in this embodiment so that the transparent member may be more easily rotated, but any other suitable means may be provided for rotating the transparent member.

To insure that the calculator can be operated easily and efficiently, a friction reducing means is provided between the center disc 12 and outer disc 16 to reduce the amount of friction, thus permitting the outer disc 16 and the transparent member 32 to be rotated together when the operator holds the center discs, because there is less friction to overcome between the two discs than between the outer disc and the transparent member. In this particular embodiment, the center and outer discs are normally made of a heavy paper or cardboard substance, and two plastic sheets 40 and 42 are provided between the center disc 12 and the outer disc 16. These thin plastic discs 40 and 42 are approximately the diameter of the outer disc 16, and provide contacting surfaces to produce reduced friction between the discs 12 and 16. Any other suitable means may be provided to reduce the friction between the center disc 12 and outer disc 16 such as coating the contacting surfaces with an appropriate organic resin such as teflon or an inorganic resin containing silicon.

Since this reduced friction between center disc 12 and outer disc 16 permits the discs to rotate freely with respect to each other, the outer disc 16 and the transparent member 32 will normally be rotated together if the center disc is held by the operator with one hand and the operator grasps the tab 38 on the transparent member 32 and rotates the transparent member about the center axis 44 defined by the fastener 34 through the center of center disc and outer disc.

Figure 4:
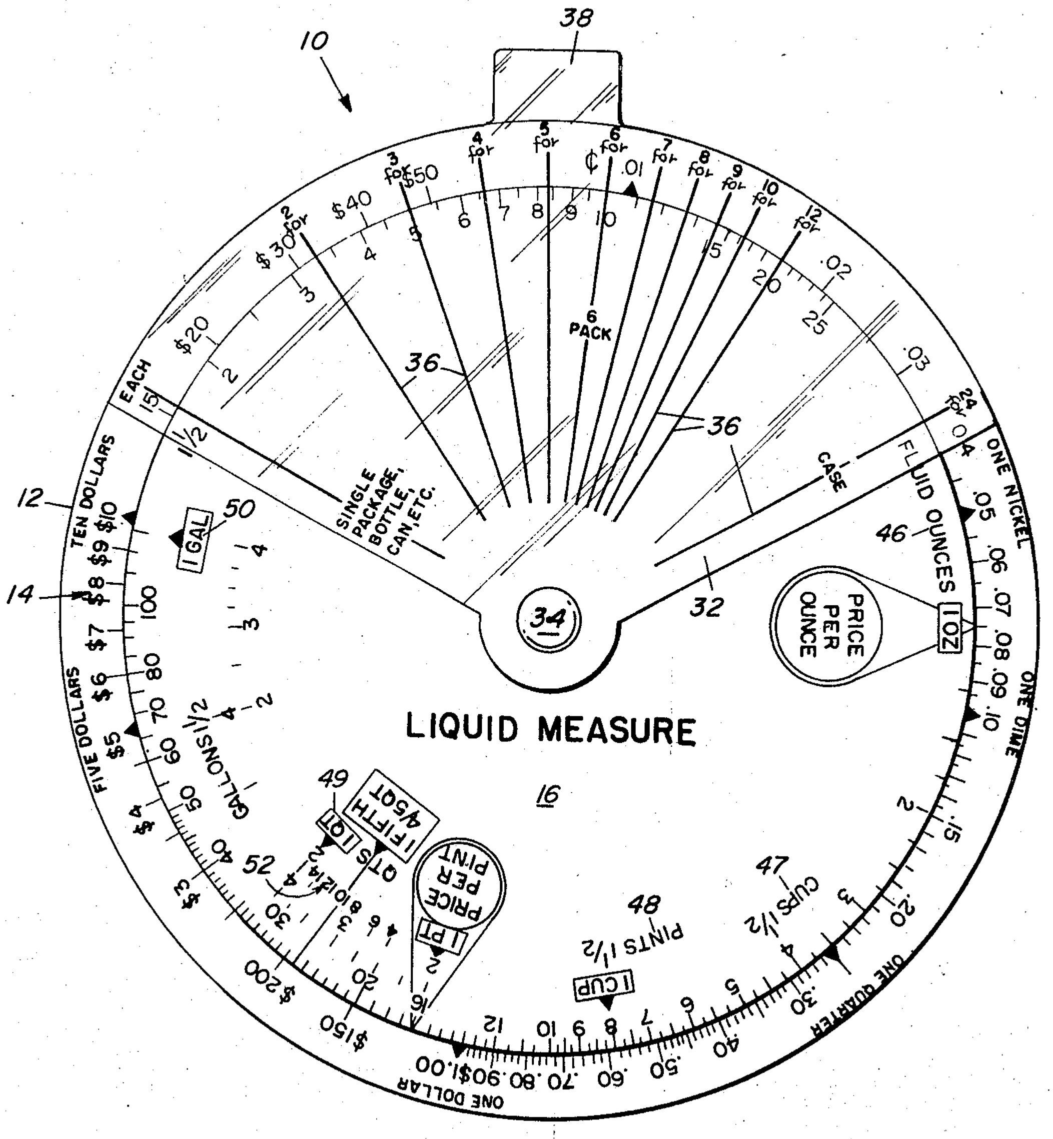
FIG. 4 is a plan view of a calculator and comparison device according to the present invention showing the liquid measure scale on the face of an outer disc.

FIG. 4 illustrates a calculating and comparison device similar to the one shown in FIG. 3 except for the fact that the outer disc is graduated in logarithmic scales with the indicia indicating standard liquid measure rather than dry weight measure. The center disc 12 has a monitary scale 14 and the transparent member 32 has the unit scale 36. The inner disc 16 has a plurality of subscales which are marked off in various liquid measures. The first subscale 46 is marked off in indicia indicating fluid ounces from 1 to 128. The subscale 46 representing fluid ounces is located on the outer periphery of the outer disc 16 similarly to the dry weight measure ounce subscale 22 shown in FIG. 3. Cup 47, pint 48, quart 49 and gallon 50 subscales are located inwardly from the fluid ounce subscale 46, and the indicia and hash marks of the cup, pint, quart and gallon subscales correspond to the number of ounces on the fluid ounce scale 46. For example, one-half cup equals 4-ounces, 1 cup or one-half pint equals 8 ounces, 1 pint equals 16 ounces, 1 quart equals 32 ounces, or 2 pints, one-half gallon equals 64 ounces, and 1 gallon equals 128 ounces. The values of cup subscale 47 range from ½ to 4; the pint subscale 48 ranges from ½ to 4; the quart subscale 49 ranges from 1 quart to 1 gallon, and the gallon subscale 50 ranges from ½ to 25. A secondary subscale 52 between the 1 pint and 1 quart hash marks further graduates quart subscale 50 into indicia of 1 through 16.

There are several ways to manipulate the calculating device, and both the dry weight calculator and liquid weight calculator would operate in the same fashion. Therefore, for illustrative purposes and to show the operation of the device, the dry weight calculator as shown in FIG. 3 will be used. One problem the shopper usually encounters in a store is to determine the price per ounce of two similar items of different brands in different size packages at different prices. For example, if the shopper desired to know the price per unit ounce of a single item, he merely aligns the "Each" hash mark on the transparent member 32 over the number of ounces corresponding to the weight of the package on scale 22 on the outer disc 16 and rotates the transparent member and the outer disc 16 together so that the "Each" hash mark and the ounce hash mark on scale 22 coincide with the price on the package on the scale 14 on the center disc. Then he reads the price per ounce at the enlarged arrowhead marker 28. If the shopper desired to check a second package of a different size and price, he would merely move the "Each" hash mark over the indicia on scale 22 which would correspond to the weight of the second package and then again move the transparent member 32 and outer disc 16 simultaneously so that the "Each" hash mark is aligned with the price of the second package, thus determining the price per ounce on the second package so he can mentally compare the prices. Another method of using the calculator device can be explained by looking at the figure illustrated in FIG. 3. If there are two brands of a plurality of units, packages, cans or the like on sale at different prices, for example, three cans of a brand X for $1.00 and seven cans of a brand Y for $1.42, the calculator can be used by the shopper to determine the best buy. In this example, each of the cans of brand X and Y are the same size, such as 12 ounces. The shopper would initially set the "Each" hash mark on the scale 36 on the transparent member 32 over the 12-ounce hash mark on subscale 22, then he would rotate the transparent member 32 and the outer disc 16 simultaneously so that for "3 For" hash mark on scale 36 of the transparent member 32 is aligned with the $1.00 hash mark on scale 14 of the center disc 12. The result of this manipulating permits the shopper to read the price per ounce at arrow 28 which would in this example be 2.8 cents per ounce. In order to compare the price per ounce of brand X with the price per ounce of brand Y, the shopper would merely move the transparent member 32 which would also move the outer disc 16 so that the line "7 For" on the scale 36 of the transparent member 32 is aligned approximately with the $1.42 mark on the monetary scale 14 of center disc 12, and then read the price per ounce at arrow 28 which in this particular example would be 2 cents per ounce, thus the shopper can easily determine that the best and most economical buy of the two products brands X and Y would be brand Y at 2 cents per ounce.

There are other comparisons and calculations which the shopper can make with the calculator, but the two calculations described are the ones which will be used most often.

The specific markings such as the arrows 28 and 30 and the many different scales and subscales are used to make it easier for the shopper to obtain the desired results and prevent him from having to make any conversion, such as from ounces to pounds, pints to quarts, etc.

Figure 5:
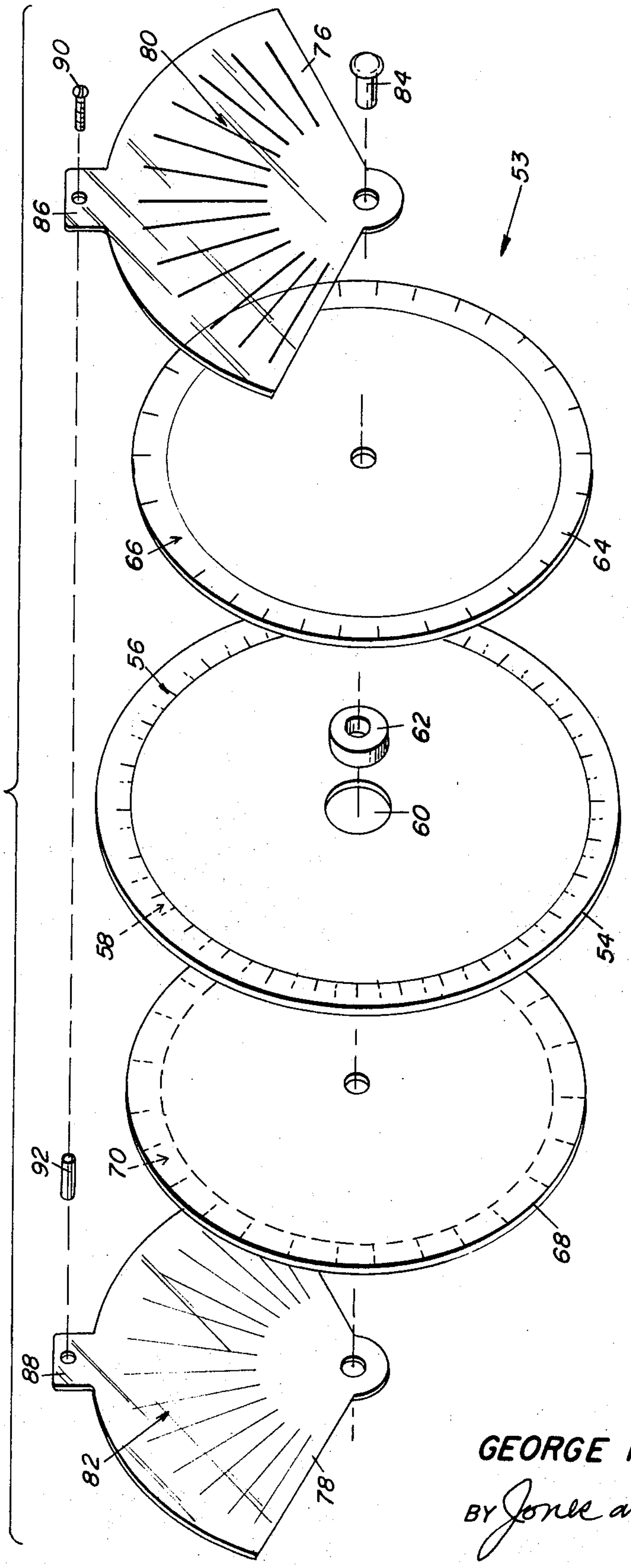
FIG. 5 is a perspective exploded view of another embodiment of the present invention showing a calculator device according to the present invention having a center disc, two outer discs, and a pair of arc-shaped transparent members.
Figure 6:
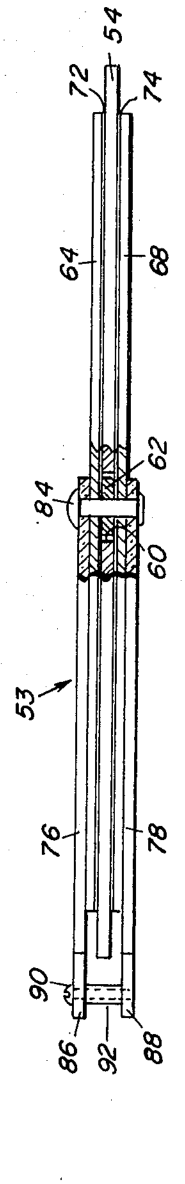
FIG. 6 is a side view of the assembled calculator device shown in FIG. 5 according to the present invention.

Normally, when going to a store, most shoppers would want to have both a liquid and dry weight calculator and comparison device; therefore, the preferred embodiment is shown in FIGS. 5 and 6 which combine both the liquid measure and dry weight calculator on the same device. In FIG. 5, the numeral 52 illustrates a calculator having a center member 54 with corresponding monetary scales 56, 58 which are disposed around the periphery of the center disc 54, similarly to the monetary scales shown in FIGS. 3 and 4. A center aperture 60 is provided to receive a spacer 62. The center disc can be made of plastic or any other suitable material; however, in this embodiment, an opaque plastic is preferred. An outer disc 64 as shown on the right in FIG. 5, similar to the outer disc 16 of calculator shown in FIG. 1, is provided and has a dry weight measure scale 66 etched thereon. A second outer disc 68 is provided, shown to the left of the center disc 54 in FIG. 5, and has the liquid measure scale 70 etched thereon. The center disc 54 and spacer 62 are sandwiched between the two outer discs 64 and 68, and the outer discs 64 and 68 contact the spacer 62 as shown in FIG. 6. The spacer 62 is thicker than the center plate 54 so that if the center disc 54 is centered on the spacer as shown in FIG. 6, gaps 72 and 74 exist between the center disc 54 and outer disc 64 and 68, respectively. The spacer provides means to reduce the friction between the center disc and the outer discs and permits the outer discs to rotate freely with respect to the center disc. A pair of arc-shaped transparent members 76 and 78, similar to the arc-shaped members as shown in FIG. 1, and having appropriate unit scales 80 and 82 etched thereon, are secured to the outside of the outer disc by a fastener 84 of any suitable type which extends through the center of the disc. The fastener 84 holds the transparent member 76, the outer disc 64, the spacer 62, the outer disc 68, and transparent member 78 firmly together while permitting the transparent member to rotate with respect to the outer disc. The transparent members 76 and 78 have tabs 86 and 88, respectively, which have apertures to receive a fastener 90 such as a pin, screw, bolt or the like. In this particular embodiment, a spacer 92 is also provided to space the transparent members the appropriate distance apart on the faces of outer discs 64 and 68. The dry weight and liquid measures scales are identical to the ones described above and shown in FIGS. 3 and 4. If desirable, the fastener 90 and spacer 92 may be eliminated so that the transparent members 76 and 78 can be operated independently of one another. This preferred embodiment provides a calculator having both the dry weight and liquid measures scales and may be manipulated as described above.

It can be seen from the above description showing that this improved calculator and comparison device provides means for manipulating and using three scales simultaneously in order for the shopper to compare prices per plurality of unit packages more easily. Also, the device provides friction-reducing means to permit the transparent member and outer disc to be moved together without moving the center disc, and a device which can be economically made.

This preferred embodiment can be modified in various ways, such as by providing different materials, changing the shape of the transparent member, changing the graduation of the scales, for example, from 1 cent to $200 or extending the range of the scales, for example, from 1/16 to 500 ounces; however, this type of variation can be made in the subject invention without departing from the true spirit and scope thereof as defined by the following claims.

What is claimed is:

1 A calculator and comparison device comprising:

a. a first disc having a first scale around its peripheral edge;

b. a second disc associated with said first disc and having a second scale around its peripheral edge, said second disc being of such a diameter that said first disc and said second disc scales are visible concurrently, said second disc being rotatable with respect to said first disc about a common axis;

c. operator means for establishing a relationship between values of said first and second scales on said first and second discs, said operator means having a third scale thereon which is adapted to be aligned with said values on said first and second scales concurrently;

d. means for securing said first and second discs and said operator means together so that they can be separately rotated with respect to one another about said common axis; and e. index means on one of said scales cooperating with at least one of the other scales to indicate the result of said calculation.

2. The calculator of claim 1, wherein said first scale is a series of logarithmic scales which are marked off in indicia indicating a dollars and cents value.

3. The calculator of claim 2, wherein said third scale is a logarithmic scale which is marked off in indicia ranging between 1 to 24.

4. The calculator of claim 2, wherein said second scale is a logarithmic scale which is marked off in indicia ranging from approximately 1 to 128 ounces.

5. The calculator of claim 4, wherein said third scale is a logarithmic scale which is marked off in indicia ranging from 1 to 24.

6. The calculator of claim 4, wherein said second disc further includes a fourth and fifth scale, said fourth scale being marked off in indicia ranging from approximately ¼ to 300 pounds, and being located inwardly and corresponding to the appropriate indicia on said second scale, said fifth scale having secondary scales each being marked off in indicia from 1 to 16 ounces, said fifth scale being superimposed on said fourth scale beginning at 1 pound and corresponding to the appropriate indicia on said second and fourth scales.

7. The calculator of claim 6, wherein said second disc further includes a sixth, seventh, eighth and ninth scale, said sixth scale being located inwardly from and corresponding to the appropriate indicia on said second scale, said sixth scale being marked off in indicia ranging from approximately ½ to 4 cups, said seventh scale being located inwardly from said sixth scale and corresponding to appropriate indicia on said second and sixth scales, said seventh scale being marked off in indicia ranging from ½ to 4 pints, said eighth scale being located inwardly from said seventh scale and corresponding with appropriate indicia on said second, sixth and seventh scales, said eighth scale being marked off in indicia ranging from 1 quart to 4 quarts, and said ninth scale being located between said second and said seventh scale and corresponding to appropriate indicia on said second, seventh, and eighth scales, said ninth scale being marked off in indicia ranging from approximately ½ to 25 gallons.

8. The calculator of claim 6, wherein said third scale is a logarithmic scale which is marked off in indicia ranging from 1 to 24.

9. The calculator of claim 1, wherein said third scale is a logarithmic scale which is marked off in indicia ranging from approximately 1 to 24.

10. The calculator of claim 1, wherein said second disc is located between said first disc and said operator means, said operator means being a transparent member, whereby the third scale on said transparent member is alignable with said first and second scales on said first and second disc when establishing a relationship between the values on the respective scales.

11. The calculator of claim 1, further including means for permitting said operator means and said second disc to be rotated together after the relationship between said third scale and said second scale has been established and while establishing the relationship between said third scale and said first scale.

12. The calculator of claim 11, wherein said means for permitting said operator means and said second disc to rotate together comprising a friction reducing means between said first and second discs so that a greater frictional force exists between said second disc and said operator means.

13. The calculator of claim 12, wherein said means for reducing friction between said first and second discs comprises a coating of a resin on at least one of the contacting surfaces of said discs.

14. The calculator of claim 13, wherein said resin coating is an organic resin.

15. The calculator of claim 14, wherein said organic resin is Teflon.

16. The calculator of claim 13, wherein said resin coating is an inorganic resin.

17. The calculator of claim 16, wherein said inorganic resin coating contains silicon.

18. A calculator and comparison device comprising:

a. a first disc having a first and second scale around the peripheral edge on the opposite surfaces of said first disc, said first and second scales being a series of four logarithmic scales and being marked off in indicia indicating dollar and cents values;

b. a second and third disc rotatably secured to opposite sides of said first disc, said second disc having a plurality of logarithmic scales around its peripheral edge, said plurality of scales on said second disc being marked in indicia indicating standard dry weight measures, said third disc having a plurality of logarithmic scales around its peripheral edge, said plurality of scales on said third disc being marked in indicia indicating standard liquid measures, said second and third discs being of such diameter that the first and second scales on said first disc can be read simultaneously with the plurality of scales on said first and second discs, respectively;

c. a first and a second transparent member associated with and rotatably secured to said second and third discs, respectively, and said first disc, said first and second transparent members each having thereon a logarithmic scale being marked in indicia ranging from 1 to 24, said transparent members being arranged so that their scales can be superimposed over the plurality of scales on said second and third discs and said first and second scales on said first disc, respectively, thereby permitting the simultaneous use of the scale on said first transparent members, said first scale and said plurality of scales on said second disc, and the simultaneous use of the scale on said second transparent member, said second scale and said plurality of scales on said third disc; and d. means for rotatably securing said first, second ad third discs and said first and second transparent members together so that each can be separately rotated with respect to the others about a common axis.

19. The calculator of claim 18, further including means for securing said first and second transparent members together so that they can be rotated together.

20. The calculator of claim 18, further including means to reduce the friction between said first and said second discs and said first and third discs so that there will be a greater amount of friction between said second disc and said first transparent member and said third disc and said second transparent member, thereby permitting said second disc and said first transparent member to be rotated together and said third disc and said second transparent member to be rotated together.

21. The calculator of claim 20, further including means for securing said first and second transparent members together so that they can be rotated together.

22. The calculator of claim 20, wherein said means for reducing friction between said disc is at least one plastic disc sandwiched between said first disc and said second disc and between said first disc and said third disc.

23. The calculator of claim 20, wherein said means for reducing friction between said discs comprises a coating of a resin on at least one of the contacting surfaces between said first and second discs and said first and third discs.

24 The calculator of claim 23, wherein said resin coating is an organic resin.

25. The calculator of claim 24, wherein said organic resin is Teflon.

26. The calculator of claim 23, wherein said resin coating is an inorganic resin.

27. The calculator of claim 26, wherein said inorganic resin contains silicon.

28. The calculator of claim 20, wherein said means for reducing friction between said disc includes;

a. a spacer carried in a central aperture in said first disc, said spacer contacting said second and third discs, and said means for securing said discs together adapted to hold said first and second transparent members, said second and third discs and said spacer together and permitting them to rotate separately, said spacer permitting said first disc to rotate freely.

* * * * *